United States Patent Office 3,290,391
Patented Dec. 6, 1966

3,290,391
PRODUCTION AND PURIFICATION OF A
DIPHENYLOLPROPANE
Walter H. Prahl, Buffalo, and Sol J. Lederman and Ellis I. Lichtblau, Kenmore, N.Y., assignors to Hooker Chemical Corporation, Niagara Falls, N.Y., a corporation of New York
No Drawing. Filed Dec. 31, 1962, Ser. No. 248,279
The portion of the term of the patent subsequent to Jan. 15, 1980, has been disclaimed
4 Claims. (Cl. 260—619)

This is a continuation-in-part of our parent application Ser. No. 791,281, filed February 5, 1959, now U.S. Patent 3,073,868, issued January 15, 1963, and of Ser. No. 176,923, filed March 2, 1962, and now U.S. 3,207,795.

This invention relates to the production of 2,2-(4,4'-dihydroxydiphenyl) propane and more specifically to the production of 2,2-(4,4'-dihydroxydiphenyl) propane of a high degree of purity from phenol and unsaturated hydrocarbons.

Bisphenol-A (as 2,2-(4,4'-dihydroxydiphenyl) propane is known), is conventionally produced by the condensation of two mols of a phenol with one mol of acetone in the presence of an acidic substance. It can be prepared, however, by other methods also, such as, for instance, by the reaction of phenol with substances containing double or triple bonds, such as propadiene (allene), propyne (methyl acetylene), and mixtures thereof, under the influence of a Friedel-Crafts or Lewis acid catalyst such as boron trifluoride.

In the production of 2,2 - (4,4' - dihydroxydiphenyl) propane by the above process and by other manufacturing methods also used to produce commercial Bisphenol-A, a number of impurities may be formed. Such impurities may comprise, for example, higher condensation products, containing, for instance, three phenolic nuclei to two radicals of the ketone, and still higher condensation products in form of resins and tars, and condensation products having a composition similar to, or identical with, that of the 2,2-(4,4'-dihydroxydiphenyl) propane, but having different properties (possibly isomers, hemiacetals or similar compounds), and condensation products of the ketone with itself, and high molecular colored substances and others.

For the production of Bisphenol-A, numerous processes are known which differ, among other ways in the manner in which they treat these impurities. These processes of the prior art usually apply to purification of Bisphenol-A made from acetone and phenol, rather than that made from propyne or propadiene and phenol in the presence of a catalyst, such as BF₃. Some processes do not attempt to separate these impurities at all. Their disadvantage is that all or most of the contaminants remain in the product, resulting in a bisphenol which contains as much as 20 mol percent impurities, as indicated by the freezing point, and the presence of a quantity of colored substances which causes a pronounced yellow or brownish color of the product.

In other processes advantage is taken of the fact that in the condensation, a stage is reached where the desired product is present as a crystalline phase, normally as a slurry in mother liquor. Such processes separate these crystals from the mother liquor, thereby effecting a considerable degree of purification, especially if such crystals are washed with solvents, such as water, phenol, etc. The disadvantage of such processes is their complication. By separating the crystals from the mother liquor the process flow is split into two parts, each of which requires its own separate further treatment. The impurities, although essentially removed from the crystals, accumulate in the mother liquor and pose the problem of removing them from it, before the valuable ingredients of the mother liquor can be recycled.

Other processes remove the impurities by recrystallizing the impure product from solvents. This process poses the problems of recovering solvents, recovering the product remaining, together with the impurities in the solvents, and is, in general, technically complicated.

It has been suggested to purify the product by crystallization of its addition product with phenol, but, again, part of the product is left in the mother liquor of the process, part of it is left in the mother liquor of the recrystallization process and the valuable ingredients of both process parts have to be recovered, thereby making the process more complicated.

It has also been suggested that the product may be purified by extraction with hot heptane or similar paraffinic hydrocarbons. Although this process is able to improve the quality considerably, it fails to remove most of the colored substances contained in the crude product, resulting in a finished product which is of low quality regarding color.

It would appear that a distillation of the crude product could result in a pure product, and this method of purification has been suggested. In carrying out the distillation, it is relatively easy to remove lower boiling contaminants, such as phenol, isopropyl phenol, isopropenyl phenol, and so forth, as well as the higher boiling substances, such as the higher condensation products, colored materials, traces of metal, etc. The distillation can be achieved by observing a number of necessary precautions, such as: insuring the complete absence of acidic or alkaline substances and other material such as certain salts, which could act as catalysts in the rapid decomposition of bisphenol to resinous matter; employing a very good vacuum; employing the shortest possible holding time in the evaporator; preferably using a thin-surface evaporator, etc. In spite of all these precautions, however, it is difficult to avoid a partial decomposition of the bisphenol. The distillate of even the most carefully distilled bisphenol may contain quantities of a yellow resinous substance, having a slightly lower boiling point than bisphenol, and causing a low freezing point and unsatisfactory color.

All the above mentioned purification processes have, in addition to individual shortcomings, the one common disadvantage that the removal of the impurities lowers the yield of product considerably, as compared to the crude commercial product which contains up to 20 percent impurities.

An object of the present invention is to produce 2,2-(4,4'-dihydroxydiphenyl) propane of a very high degree of purity which may be determined by a freezing point higher than 156.5 degrees centigrade. A further object of the invention is to provide a simple economical method of purifying crude Bisphenol-A containing impurities formed as by-products of the reaction. Another object of the invention is to provide a process for the production of Bisphenol-A having a very high degree of purity at a yield essentially the same as that obtained in producing a crude product containing a considerable percentage of impurities. Other objects of the invention will become apparent in the course of the description.

Reasoning underlying this invention includes the following. Although it appears tempting to base a purification on the voluntary appearance of crystals of bisphenol, or addition products of bisphenol with phenol, in the course of the condensation, processes using this method of purification suffer from the necessity for separating these crystals as by filtering or centrifuging, in the presence of strong, highly corrosive acids, such as sulfuric or hydrochloric acid, of freeing the crystals of the last traces of such acids as by washing and by working up the mother liquors consisting of excess phenol, water, acids, impurities and bisphenol to recover the valuable ingredients.

Table I shows several of the foregoing described properties when Bisphenol-A, or 2,2-(4,4'-dihydroxydiphenyl) propane, was tested with various solvents.

TABLE I

| Solvents | Boiling Point | Gms. Bisphenol-A Soluble in 100 Gms. Solvent | Gms. Resin* Soluble in 100 Gms. Solvent | Ratio of Solubility of Resin* to Bisphenol-A | Extracted Bisphenol-A | | |
|---|---|---|---|---|---|---|---|
| | | | | | Freezing Point | Light Transmittance | Yield, Percent |
| Ethyl ether | 34 | 127.0 | 122.5 | 0.984 | | | |
| N-pentane | 36 | 0.0166 | 0.0462 | 2.69 | 152.2 | 3.3 | 94.0 |
| Methylene chloride | 40 | 0.859 | 68.43 | 79.7 | 156.8 | 64.5 | 80.6 |
| Cyclopentane | 49 | 0.0075 | 0.1593 | 21.2 | 151.8 | 6.0 | 94.9 |
| Acetone | 56 | 108.6 | 127.0 | 1.169 | | | |
| N-hexane | 69 | 0.0108 | 0.2175 | 20.01 | 152.0 | 3.5 | 94.5 |
| CCl₄ | 76 | 0.0369 | 0.726 | 19.58 | 153.3 | 4.0 | 92.4 |
| Ethyl acetate | 77 | 83.95 | 65.3 | 0.778 | | | |
| Ethanol | 78 | 150.5 | 74.6 | 0.495 | | | |
| Benzene | 80 | 0.6105 | 98.60 | 161.5 | 156.8 | 68.0 | 87.1 |
| Cyclohexane | 81 | 0.0023 | 0.01534 | 6.68 | 152.8 | 3.5 | 94.3 |
| Ethylenedichloride | 83 | 0.9338 | 43.15 | 46.3 | 156.3 | 69.5 | 86.2 |
| Trichloroethylene | 87 | 0.077 | 87.15 | 1,132 | 155.5 | 17.0 | 88.0 |
| N-heptane | 98 | 0.0095 | 0.1687 | 17.76 | 154.1 | 3.2 | 91.9 |
| Methylcyclohexane | 100 | 0.0043 | 0.144 | 33.5 | 152.1 | 5.3 | 95.0 |
| Toluene | 110 | 0.3362 | 63.05 | 187.6 | 156.5 | 76.0 | 88.0 |
| Acetic acid | 118 | 21.61 | 65.2 | 3.02 | | | 20.0 |
| Chlorobenzene | 132 | 0.1194 | 98.70 | 826.2 | 156.4 | 39.0 | 88.7 |
| Xylene | 140 | 0.1645 | 89.05 | 541.5 | 156.4 | 69.7 | 88.6 |
| Cumene | 152 | 0.1346 | 4.48 | 33.3 | 156.2 | 26.0 | 88.6 |
| O-dichlorobenzene | 180 | 0.1319 | 43.4 | 329 | 156.4 | 69.0 | 88.6 |
| Ethylene glycol | 182 | 75.0 | 54.48 | 0.732 | | | |
| Nitrobenzene | 210 | 6.49 | 13.52 | 2.08 | 155.8 | 3.3 | 75.0 |
| Trichlorobenzene | 213 | 0.0095 | 2.66 | 280 | 155.3 | 13.0 | 90.0 |
| Triisopropylbenzene | 234 | 0.682 | 1.44 | 2.11 | 153.3 | 3.2 | 90.0 |
| Glycerine | 290 | 18.38 | 2.693 | 0.1466 | | | |
| Original sample | | | | | 147.1 | 3.2 | |

*Typical and representative resinous material isolated from crude Bisphenol-A.

Owing to these complications of processes attempting purification in the course of the condensation it is economically desirable to omit, except for precautions for minimizing the formation of impurities, attempts at purification in the course of the condensation, and to carry out the purification after a crude product containing essentially all of the impurities accumulated in the course of the condensation has been produced.

The main problem of this invention then is to remove the impurities out of the crude product. A partial solution to this problem is in the suggestion of Canadian Patent 551,049 to extract a crude bisphenol by means of hot paraffinic hydrocarbons, preferably heptane. This solution was only partially effective because, although by this method a considerable portion of the impurities can be removed, another portion, especially that comprising the colored materials cannot be removed economically. A problem was to find a solvent which has a much higher purifying ability than the paraffinic hydrocarbons, a solvent which, more specifically, is able to remove the colored impurities as well as the other impurities.

The properties postulated for this solvent are: It should be easily and economically available; it should have a low boiling point in order to permit an easy drying of the extracted product; and, as its most important property, it should have a high dissolving power for the colored materials combined with a low dissolving power for bisphenol. In searching for such solvent, it was found, however, that these criteria alone are not sufficient to define suitable solvents for the purification of Bisphenol-A made by the herein described processes.

In this investigation, the purity of a Bisphenol A product is determined from the expressed by two criteria, namely, freezing point and color. The freezing point was taken in the usual manner in a one inch test tube surrounding by an insulating jacket and using a thermometer divided into tenths of a degree, calibrated against an instrument normalized by the Bureau of Standards, with stem correction applied. The color was characterized by measuring, in a one-half inch cell of a "Spectronic 20" colorimeter, produced by Bausch and Lomb, the relative transparency to light of 350 millimicron wave length of a 50 percent solution of the bisphenol in ethyl alcohol.

Table I shows, in the first vertical column a number of different solvents so tested, arranged in ascending order of their boiling points, in the second column their boiling points, in the third column the solubility of bisphenol in them. The fourth column shows the solubility in them of a typical and representative resinous material of a brown color isolated from crude bisphenol. These solubilities were measured by saturating each solvent at room temperature with a slight excess of pure Bisphenol-A or resin, respectively, separating the solution from the undissolved excess, evaporating a known quantity of the solution to dryness and weighing the residue. The sixth, seventh and eighth columns give the freezing point, the light transmittance, and the yield of product obtained by pouring 100 grams of a commercial grade of Bisphenol-A, having a freezing point of 147.1 degrees centigrade, and a light transmittance of a 50 percent alcoholic solution thereof of 3.2, into 200 grams of solvent, agitating the mixture for 3 minutes, separating the liquids from the solids in a Büchner filter with suction, washing the crystal in the filter with another 100 grams of solvent, drying the solid in vacuum, by gradually heating up to the melting point, and measuring the freezing point and light transmittance as previously described. The commercial bisphenol was one that had had impurities distilled off from it and had been solidified as described in Example 4.

As expected it was found that the solvents gave an improvement in the quality of Bisphenol-A, either in color, freezing point or both of these. Taking, however, the kind of improvement in freezing point and in color and especially in both simultaneously, and also the yield of product obtained, the ease of drying, and other factors into consideration, it was found that there are great differences between solvents which make some of them outstandingly suitable, and others entirely unsuitable for the purpose of purifying Bisphenol-A by solvent extraction.

Comparing first the solubility of Bisphenol-A in different solvents with their ability to purify Bisphenol-A, it is obvious that for good results the solubility should be within certain limits. Solvents in which the solubility, under the conditions applied, is less than 0.1 percent, give in general a good yield but a low quality of the extracted bisphenol as demonstrated by freezing point and light transmittance. The reason may be that their low solvent power for the bisphenol prevents them from penetrating into the crystal interstices. On the other hand, the solubility of the bisphenol should not exceed a certain upper limit, because otherwise too much of it is dissolved with the impurities, resulting in a low yield.

Comparing next the ratios of solubility of Bisphenol-A and of resinous impurity in a solvent, it is obvious that a theoretical conclusion that any solvent should be suitable in which this ratio of solubility is higher than one is not correct. It appears that for a practical, usable purification the ratio of solubility of the bisphenol and resin in any given solvent should be at least 30 in order to make that solvent of any use for extraction.

Generalizing the results of the experiments given in Table I and other experiments, it was found that oxygen-containing solvents such as ethanol, acetone, acetic acid, etc. have a low degree of suitability, mainly because of their high solvent power for Bisphenol-A. Paraffinic and cyclo-paraffinic hydrocarbons and their derivatives have also a low degree of suitability, by reason of their low solvent power for impurities. Some of the low boiling chlorinated hydrocarbons combine a low solvent power for the bisphenol with a high solvent power for the resins, and thus are well suited for the purpose.

Of all the substances investigated the aromatic hydrocarbons show the best combination of vapor pressure, solvent power for the bisphenol and for impurities. Among them, benzene is the most suitable by reason of its high vapor pressure, low solvent power for the bisphenol, high solvent power for impurities and ready availability. The solvents which were found, as a result of these experiments, to be well suited for the purification of the bisphenol are far superior in this respect to paraffinic hydrocarbons suggested previously for that purpose.

The following three examples show the application of several solvents to the purification of a bisphenol.

In the examples, all parts are by weight, unless otherwise indicated.

*Example 1*

One hundred grams of Bisphenol-A of the properties of commercially available material, in flake form, having a freezing point of 153.9 degrees centigrade and a relative transparency of 28 percent were mixed in a beaker with 200 grams of heptane, heated under constant agitation to 70 degrees centigrade and kept at this temperature under continued agitation for 3 minutes. The mixture was then filtered through a Büchner filter under vacuum, washed with 100 grams heptane, dried by heating it under vacuum of approximately 1 millimeter of mercury to its melting point, and the product resulting was then tested. The freezing point was found to be 155.4 degrees centigrade and the relative transparency was 38.5 percent. Using a cryoscopic constant of 10 degrees centigrade depression for 1 mol of solute in 1000 grams of bisphenol, and taking the freezing point of the pure material as 157.3 degrees centigrade, the treatment with heptane had reduced the impurities of this commercial bisphenol from 7.2 mol percent to 4.15 mol percent, while the colored impurities were reduced in a ratio of 72 to 61.5. Similar results are obtainable with the Bisphenol-A made from acetone and phenol, propyne and phenol or propadiene and phenol.

*Example 2*

The same material was subjected to a treatment exactly the same in all details as in Example 1, except that instead of heptane, benzene was used and the temperature was 25 degrees centigrade instead of 70 degrees centigrade. This product showed a freezing point of 156.0 degrees centigrade and a relative transparency of 64.8 percent. The total impurities were thus reduced from 7.2 mol percent to 2.9 mol percent, giving about 40 percent improvement in the removal of all impurities over that effected by heptane, while the coloring materials were reduced in the ratio from 72 to 35.2, showing an improvement of the color removal of 350 percent effected by benzene over that effected by heptane.

This example and similar experiments with other solvents show that the solvents selected according to this invention in general, and specifically benzene, are far superior to the paraffinic hydrocarbons for extracting impurities in general, and especially for extracting the colored impurities from Bisphenol-A.

*Example 3*

Example 2 was repeated in exactly the same form except that instead of benzene, methylenedichloride was used. A freezing point of 155.8 degrees centigrade and a color of 61.0 percent relative transparency were obtained. This example and similar experiments with other solvents establish that the solvents selected according to this invention, and specifically methylenedichloride, are better extracting agents for impurities in general and especially for the colored impurities, than the heptane suggested before, and that a product of better quality is obtained by the present invention.

In the course of these experiments another unexpected observation was made which should be considered to constitute a part of the present invention.

It is apparent that the rate and the degree of extraction from a solid by a solvent should depend upon the grain size of the solid. In addition, the surprising observation was made that in the case of the extraction of the impurities from the bisphenol, for any given grain size the success of the extraction depends to a considerable extent upon the rate at which this material has crystallized. Crude Bisphenol-A, which had been crystallized quickly on water cooled flaking rolls was much less suitable for extraction than the same material of the same grain size which had been permitted to crystallize slowly, for instance in trays cooling by natural radiation.

*Example 4*

A sample of the same crude bisphenol with which Examples 1, 2 and 3 had been carried out, was melted, poured into a glass tray in a layer about 1 inch deep and permitted to crystallize in the course of about 10 minutes. It was then broken up, ground on a rotating knife mill and screened through a 10 mesh screen. The melting point of this product remained unchanged at 153.9 degrees centigrade and the color increased to a relative transparency of 20 percent. After extracting it with heptane exactly as described in Example 1, its freezing point was found to be 156.4 degrees centigrade and its relative transparency was 48 percent, indicating a decided improvement over the figures obtained in Example 1, in which the same material had been run after cooling on flaking rolls.

*Example 5*

A sample of the same material as that used in Example 4 was extracted with benzene under otherwise the same conditions as in Example 2. It gave a freezing point of 156.6 degrees centigrade and a relative transparency of 72.4 percent. Comparison of Example 5 with Example 4 shows again the superiority of benzene over heptane. Comparison of Example 4 with Example 1, and of Example 5 with Example 2 shows that the result of the extraction of the slowly cooled material is better than of a material cooled fast, as for instance, on flaking rolls.

An explanation for the better extractions obtained from slowly crystallized material might be that in the slow crystallization larger crystals are formed, which do not include the impurities and which force the impurities to accumulate in less numerous but larger interstices than those formed in quick crystallization. However, the invention is not to be limited by this explanation.

Example 6

This example served to show the effect of distillation upon crude bisphenol. A sample of the same crude bisphenol which was used in all previous examples was distilled in glass equipment, with the shortest possible holding time, under a vacuum of less than 1 millimeter of mercury. The distillate had a freezing point of 155.1 degrees centigrade and a relative transparency of 39 percent.

This example shows that distillation removes a considerable portion of the impurities but is far from removing all of them. The reasons are probably two-fold: First, some of the impurities present in the crude phenol, especially a yellow colored resinous material, possibly a hemiacetal, has the same or very much the same molecular weight as bisphenol and is close to its boiling point, so that a simple distillation does not separate them. Secondly, in the process of distillation, regardless of the precautions, colored decomposition products may be formed.

According to the present invention a distillate so obtained, preferably a product obtained after a double distillation, in which the more volatile materials are distilled off the Bisphenol-A and the Bisphenol-A is then distilled off the product of lower volatility, under vacuum, can be further improved by extraction, and extraction with the solvents as defined in this invention is more effective than extraction with paraffinic hydrocarbons.

Example 7

The distillate of Example 6 was permitted to crystallize slowly in a glass tray, was then ground and screened through a 10 mesh screen and the grains were extracted with heptane exactly as described in Example 1. The freezing point was 156.4 degrees centigrade and the relative transparency 50.3 percent.

Example 8

The grains prepared as in Example 7 were extracted with benzene exactly as in Example 2. The freezing point was 156.6 degrees centigrade and the relative transparency was 77.1 percent.

This series of examples shows that distillation improves the quality, but not to the point obtainable by extraction, that extraction of the distillate by means of benzene and other solvents defined in this invention is more effective than the extraction with heptane, and that in either case a better quality is obtained than by extraction of undistilled material. The combination of a distillation with an extraction is therefore part of the present invention.

Example 9

This example shows that methylenedichloride as an extracting agent has essentially the same advantages over the paraffinic hydrocarbons as benzene. Similarly, toluene, xylene and chlorinated aliphatic solvents of the previously recited characteristics (solvent power ratio, solubilities, etc.) are useful, as is benzene. Crude material in flake form, and passed through a 10 mesh screen, the same material molten, solidified, ground and screened to grains of the same dimension, and the same material distilled, crystallized, ground and screened were extracted with methylenedichloride, using the same procedure as in all previous examples and gave the values:

|  | Freezing Point | Color |
|---|---|---|
| Flake | 155.8 | 61.0 |
| Grains | 156.5 | 60.8 |
| "Distilled" Grains | 156.5 | 77.6 |

The solvents filtered from the extracted material contain the impurities removed from the crude bisphenol, in solution. These impurities can be isolated and the impurities recovered in concentrated form by several methods such as crystallization, precipitation and others. We prefer to effect this separation by distillation.

Example 10

One thousand and one hundred and ten grams of crude Bisphenol-A having a freezing point of 154.0 degrees centigrade, were extracted with 1500 grams of benzene, filtered, washed with 200 grams of benzene, extracted again with 1500 grams of benzene, filtered, washed with 200 grams of benzene and dried. One thousand and twenty-eight grams of product having a freezing point of 157.0 degrees centigrade were obtained. The combined benzene solution was evaporated and left a residue of 70 grams of resinous material. The quantity of bisphenol in the residue was too small for detection.

As this example and the yield column of Table I show, the removal of the impurities by extraction may result in a loss of weight of 10 to 15 percent or more of the impure product, depending upon the percentage of impurities originally present. This weight loss might make the process, as described so far, economically unattractive, if it were not for an entirely unexpected observation which also forms part of this invention.

It was observed, that, if the impurities extracted from one batch of bisphenol are added to the ingredients of the next batch, the quantity of the impurities present in the product of that batch is about the same as that present in the product of the batch to which no impurities had been added. This surprising observation may be explained by assuming that either the impurities normally formed in the reaction are in equilibrium with bisphenol, and if they are added beforehand to the extent that they would be formed in this equilibrium, prevent the formation of new impurities, or by assuming that the impurities are of such a nature that in contact with phenol and/or ketone, and acid, they react with either the one or the other or both to form the bisphenol. Still other explanations are possible, but we do not want to be limited in any way by any explanations of this phenomenon. For the present invention it is sufficient to state that the addition of the impurities recovered from the solvent to a production batch results practically in preventing the formation of further impurities and thereby in an unexpectedly high yield. In case the process is carried out continuously as we prefer to carry out our process, the impurities coming out of the solvent recovery still would, of course, be added continuously to the other ingredients being fed continuously into the reactor.

Example 11 shows the production of 2,2-(4,4'-dihydroxydiphenyl) propane from the reaction of phenol with propyne (methyl acetylene) in the presence of boron trifluoride ($BF_3$).

Example 11

To a mixture of ninety-four parts phenol and 0.5 part boron trifluoride were added eight parts propyne, by bubbling the gas through the phenol-catalyst solution at room temperature, without agitation, in one and one-half hours. After completion of the addition of the gas, the solution was poured into hot water and agitated until it had cooled to room temperature. The phenol-bisphenol crystals were separated from the wash water and the phenol removed by vacuum distillation. The residue was 2,2-bis(parahydroxyphenyl) propane in 79 percent yield, based on the weight of propyne added. It contained impurities which can be partially removed by distilling off the Bisphenol-A, but some resin will still be present in the Bisphenol-A so produced.

It is largely to the removal of this resin that the present invention is directed and Examples 1–10 show various processes by which it is attempted to remove such resin from the Bisphenol-A desired.

The above reaction for producing Bisphenol-A may also be carried out by the use of other Friedel-Crafts or Lewis acid catalysts, such as sulfuric acid, phenol sulfonic acid, active clays, hydrogen chloride, hydrogen fluoride and halides of boron, aluminum, zinc, tin, and iron, such as ferric chloride, etc.

Instead of using propyne in the reaction of Example 11, propadiene can be used, or mixtures of the two acyclic hydrocarbons can be used to obtain the desired 2,2-(4,4'-dihydroxydiphenyl) propane.

The overall mole ratio of phenol to propyne or propadiene should be between about 2:1 and about 15:1 and the amount of catalyst to use should range between about 0.01 percent and about 3.0 percent by weight of the phenol present.

Example 12 herein shows our preferred method of preparing 2,2-(4,4'-dihydroxydiphenyl) propane of unusually high purity by means of separating the impurities.

*Example 12*

Eighty parts/time of phenol and 1.2 parts/time of recycled by-product resin, recovered by separation of the by-product resin from the bisphenol product and further reaction of by-product resin with phenol in the presence of $BF_3$, have continuously dissolved in them about 1 part/time of boron trifluoride and about 5.5 parts/time of propyne, and are continuously fed to the first of three jacketed agitated reactors arranged in series and kept at 50 degrees centigrade. To the reacted material, leaving the third reactor, 130 parts/time of phenol are continuously added with agitation. The mixture is fed to the top of the first of three columns, from which the boron trifluoride and a part of the phenol will be driven off and recovered in a condensing and/or absorbing system. The mixture coming from the bottom of the first column is fed into the second, in which the remaining phenol is continuously recovered by a vacuum distillation, and the third continuously distills, the Bisphenol-A and close-boiling impurities, as is disclosed in our pending application, Ser. No. 220,617, now U.S. Patent 3,219,549.

A tarry residue is continuously discharged from the bottom of the third column.

The distillate is continuously fed into a trough in which an internally cooled cylinder rotates. A layer of crude Bisphenol-A, having a freezing point of about 156 degrees centigrade builds up. It is continuously removed by a blade, fed into a grinder, where it is reduced to a size passing through a 10 mesh screen, and fed continuously to a separation zone for the removal of resinous by-product boiling close to Bisphenol-A.

As described in copending applications, Ser. No. 791,281 and Ser. No. 176,923, the separation of resin from Bisphenol-A is accomplished by extraction, with the material being continuously extracted by means of about 50 parts/time of benzene.

As described in copending application, Ser. No. 177,078, filed March 2, 1962, the separation of the by-product resin may be accomplished by crystallization. Under the special conditions of crystallization defined therein, the material is preferably crystallized by means of about 50 parts/time of benzene.

Upon centrifuging and drying the separated Bisphenol-A in a vacuum, a product of acceptable freezing point and light transmission, e.g., a freezing point of 156.8+ degrees centigrade and a light transmittance as defined above of 75+ percent, are obtained.

The benzene containing the extracted impurities is recovered in a continuous atmospheric distillation to leave about 1.2 parts/time of by-product resin to be treated in accordance with the improvement of this invention and to be recycled to the reactors.

The 1.2 parts/time of by-product resin are fed into the first of two agitated reactors arranged in series where about 3.6 parts/time of phenol and about 0.1 part/time of $BF_3$ are added and maintained at a temperature of between about 40 and about 150 degrees centigrade until reaction has essentially ceased. The reacted by-product material is then discharged, recycled, and charged, along with the phenol and propyne feed materials, into the said first of three agitated reactors recited at the beginning of the example.

In the process of the above example, anhydrous hydrogen chloride may also be used as a catalyst.

It is to be understood that the invention is not limited to the specific examples which have been offered merely as illustrative and that modifications may be made within the scope of the appended claims without departing from the spirit of the invention. For instance, other chlorinated aliphatic hydrocarbon solvents that have boiling points below about 130 degrees centigrade and an ability to dissolve at room temperature at least thirty times as much of the impurities contained in the crude 2,2-(4,4'-dihydroxydiphenyl) propane as of 2,2-(4,4'-dihydroxydiphenyl) propane itself, may also be used in the process of this invention. Among the saturated chlorinated aliphatic solvents are dichloromethane (methylene chloride), chloroform, carbon tetrachloride, 1,2-dichloroethane (ethylene dichloride), 1,1-dichloroethane, 1,1,1-trichloroethane, 1,1,2-trichloroethane, 1-chloropropane, 2-chloropropane, 1,1-dichloropropane, 1,2-dichloropropane, 1,3-dichloropropane, 2,2-dichloropropane, 1-chlorobutane, 2-chlorobutane, tert.-butylchloride, dichlorobutane, 1-chloropentane, 2-chloropentane, 3-chloropentane, 2-chloro-2-methylbutane, 1-chloro-2-methylbutane, 1-chloro-3-methylbutane, 2-chlorohexane, etc. And among the unsaturated chlorinated aliphatic solvents are 1,1-dichloroethylene, 1,2-dichloroethylene, trichloroethylene, perchloroethylene, 1-chloropropane, 2-chloropropane, 1,2-dichloropropane, trichloropropane, chlorobutane, chloropentane, chlorohexane, and the like. Having now described our invention, we claim:

1. A process for the recovery of a purified 2,2-(4,4'-dihydroxydiphenyl) propane from its crude reaction product produced by the condensation of phenol with a compound selected from the group consisting of propadiene, propyne, and mixtures thereof, including the steps of (1) removing the more volatile materials from the 2,2-(4,4'-dihydroxydiphenyl) propane, (2) vacuum distilling the 2,2-(4,4'-dihydroxydiphenyl) propane from materials less volatile in it, and (3) separating the distilled 2,2-(4,4'-dihydroxydiphenyl) propane from its impurities with a solvent selected from the group consisting of benzene, toluene, xylene, methylene chloride, ethylene dichloride, and trichloroethylene, whereby substantially pure 2,2-(4,4'-dihydroxydiphenyl) propane and a solvent solution of separated impurities are produced.

2. A process for the recovery of 2,2-(4,4'-dihydroxydiphenyl) propane having a freezing point greater than 156.5 degrees centigrade from its crude reaction product produced by the condensation of phenol with a compound selected from the group consisting of propadiene, propyne, and mixtures thereof, including the steps of (1) distilling the more volatile materials from the 2,2-(4,4'-dihydroxydiphenyl) propane, (2) vacuum distilling the 2,2-(4,4'-dihydroxydiphenyl) propane from materials less volatile in it, (3) separating the distilled 2,2-(4,4'-dihydroxydiphenyl) propane from its impurities with a solvent selected from the group consisting of benzene, toluene, xylene, methylene chloride, ethylene dichloride, and trichloroethylene, whereby substantially pure 2,2-(4,4'-dihydroxydiphenyl) propane and a solvent solution of separated impurities are produced, (4) recovering the separated impurities from the solvent, and (5) recycling the said impurities for use as feed in the production of 2,2-(4,4'-dihydroxydiphenyl) propane.

3. A process for the recovery of 2,2-(4,4'-dihydroxydiphenyl) propane having a freezing point greater than 156.5 degrees centigrade from its crude reaction product, produced by the condensation of phenol with a compound selected from the group consisting of propadiene, propyne, and mixtures thereof, including the steps of (1) distilling the more volatile materials from 2,2-(4,4'-dihydroxydiphenyl) propane, (2) vacuum distilling the 2,2-(4,4'-dihydroxydiphenyl) propane from materials less volatile in it, (3) crystallizing the molten distilled 2,2-(4,4'-dihydroxydiphenyl) propane, (4) breaking up the crystallized mass into grains, and (5) separating the distilled crystallized 2,2-(4,4'-dihydroxydiphenyl) propane from its impurities with a solvent selected from the group consisting of benzene, toluene, xylene, methylene chloride, ethylene dichloride, and trichloroethylene, whereby substantially pure 2,2-(4,4'-dihydroxydiphenyl) propane and a solvent solution of separated impurities are produced.

4. A process for the recovery of 2,2-(4,4'-dihydroxydiphenyl) propane having a freezing point greater than 156.5 degrees centigrade from its crude reaction product produced by the condensation of phenol with a compound selected from the group consisting of propadiene, propyne, and mixtures thereof, including the steps of (1) distilling the more volatile materials from the 2,2-(4,4'-dihydroxydiphenyl) propane, (2) vacuum distilling the 2,2-(4,4'-dihydroxydiphenyl) propane from materials less volatile in it, (3) separating the distilled 2,2-(4,4'-dihydroxydiphenyl) propane from its impurities with a solvent selected from the group consisting of benzene, toluene, xylene, methylene chloride, ethylene dichloride, and trichloroethylene, whereby substantially pure 2,2-(4,4'-dihydroxydiphenyl) propane and a solvent solution of separated impurities are produced, (4) removing substantially all the solvent from the said impurities, (5) treating the resultant impurities with phenol in the presence of an acidic condensing agent at elevated temperature to produce a reaction product comprising additional 2,2-(4,4'-dihydroxydiphenyl) propane, and (6) recovering the 2,2-(4,4'-dihydroxydiphenyl) propane produced in step (5).

References Cited by the Examiner

UNITED STATES PATENTS

| | | | |
|---|---|---|---|
| 2,884,462 | 4/1959 | Henry | 260—619 |
| 3,073,868 | 1/1963 | Prahl et al. | 260—619 |

LEON ZITVER, *Primary Examiner.*

H. G. MOORE, *Examiner.*

J. E. EVANS, *Assistant Examiner.*